United States Patent [19]
Lu

[11] Patent Number: 5,950,281
[45] Date of Patent: Sep. 14, 1999

[54] HINGE MECHANISM

[76] Inventor: Sheng-Nan Lu, No. 174, Chunying St., Shulin Chen, Taipei Hsien, Taiwan

[21] Appl. No.: 09/116,723

[22] Filed: Jul. 16, 1998

[51] Int. Cl.⁶ ................................................. E05C 17/64
[52] U.S. Cl. ............................................. 16/342; 16/337
[58] Field of Search ............................ 16/342, 352, 353, 16/337, 338, 307, 306, 339; 403/119, 120, 146; 361/681, 682

[56] References Cited

U.S. PATENT DOCUMENTS

| | | | |
|---|---|---|---|
| 2,462,304 | 2/1949 | Burdick | 16/342 |
| 4,986,507 | 1/1991 | Chiang | 16/342 |
| 5,333,356 | 8/1994 | Katagiri | 16/342 |
| 5,406,678 | 4/1995 | Rude et al. | 16/342 |
| 5,464,038 | 11/1995 | Arnold et al. | 16/342 |
| 5,566,048 | 10/1996 | Esterberg et al. | 16/342 |

Primary Examiner—Chuck Y. Mah
Attorney, Agent, or Firm—William E. Pelton, Esq.

[57] ABSTRACT

A hinge mechanism includes a pivot axle including a first cylindrical portion and a second cylindrical portion having a diameter smaller than that of the first cylindrical portion, an inner sleeve rotatably mounted on the second cylindrical portion of the pivot axle and including an inner wall containing a first hole for receiving the second cylindrical portion and an outer wall formed with a plurality of juxtaposed locking pieces, a first outer sleeve fixedly mounted on the inner sleeve and including an inner wall containing a second hole 31 for receiving the inner sleeve and an outer wall formed with a retaining block containing a retaining recess connecting to the second hole for receiving the plurality of juxtaposed locking pieces, and a second outer sleeve fixedly mounted on the first cylindrical portion of the pivot axle.

8 Claims, 3 Drawing Sheets

HINGE MECHANISM

FIELD OF THE INVENTION

The present invention relates to a hinge mechanism, and more particularly to a hinge mechanism which can be used with a notebook computer, a mobile telephone set and the like.

BACKGROUND OF THE INVENTION

A hinge mechanism usually can be used with a notebook computer, a mobile telephone set and the like. In practice, the hinge mechanism is connected between the main body and the monitor of the notebook computer such that they can be pivoted relative to each other, or connected between the main body and the transmitter plate of the mobile telephone set such that they can be pivoted relative to each other. The present invention has arisen for a hinge mechanism which can be operated easily and conveniently.

SUMMARY OF THE INVENTION

In accordance with one aspect of the present invention, there is provided a hinge mechanism comprising a pivot axle including a first cylindrical portion and a second cylindrical portion having a diameter smaller than that of the first cylindrical portion, an inner sleeve rotatably mounted on the second cylindrical portion of the pivot axle and including an inner wall containing a first hole for receiving the second cylindrical portion and an outer wall formed with a plurality of juxtaposed locking pieces, a first outer sleeve fixedly mounted on the inner sleeve and including an inner wall containing a second hole for receiving the inner sleeve and an outer wall formed with a retaining block containing a retaining recess connecting to the second hole for receiving the plurality of juxtaposed locking pieces, and a second outer sleeve fixedly mounted on the first cylindrical portion of the pivot axle.

Further benefits and advantages of the present invention will become apparent after a careful reading of the detailed description with appropriate reference to the accompanying drawings.

RETAILED DESCRIPTION OF THE PREFERRED EMBODIMENTS

Figure 1:
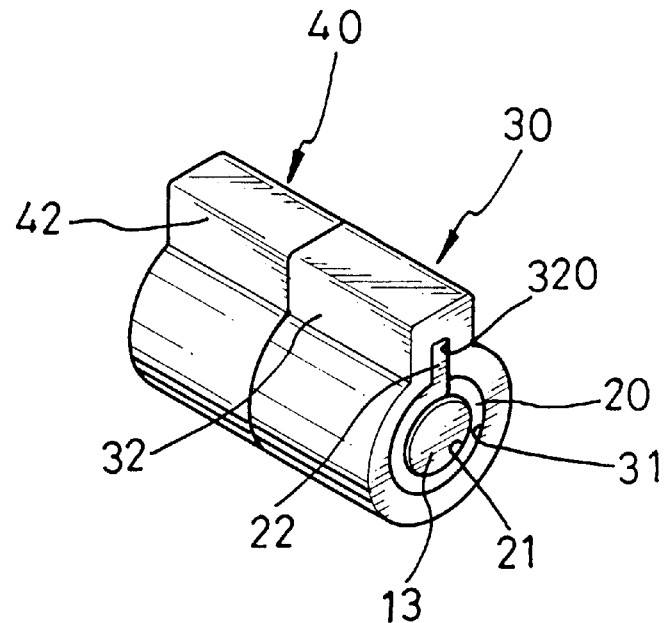
FIG. 1 is a perspective view of a hinge mechanism in accordance with the present invention.
Figure 3:
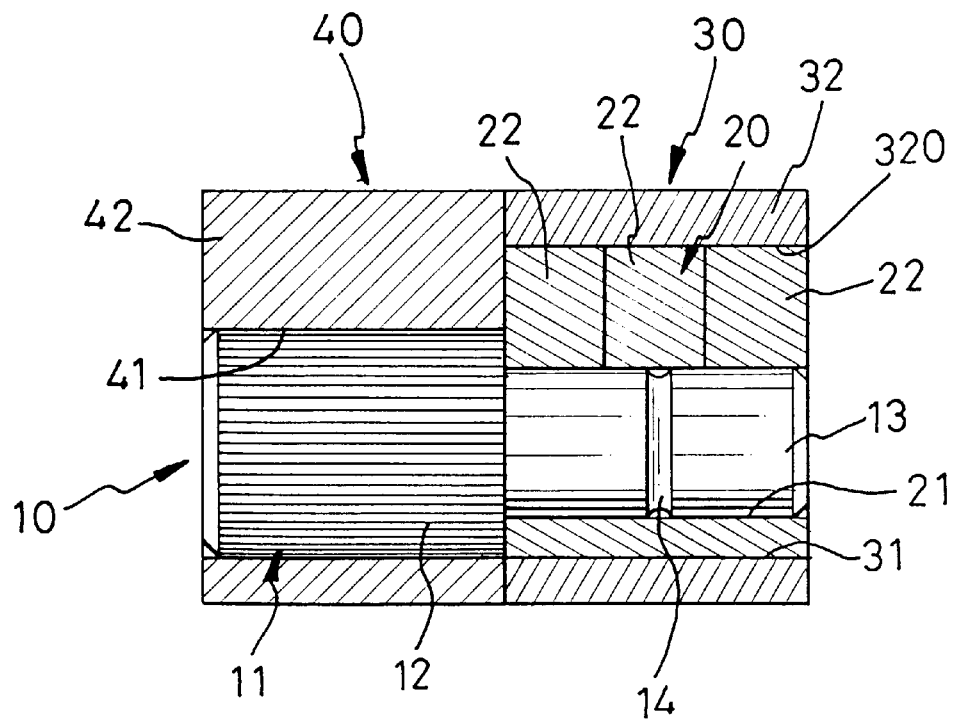
FIG. 3 is a front plan cross-sectional view of the hinge mechanism as shown in FIG. 2.
Figure 2:
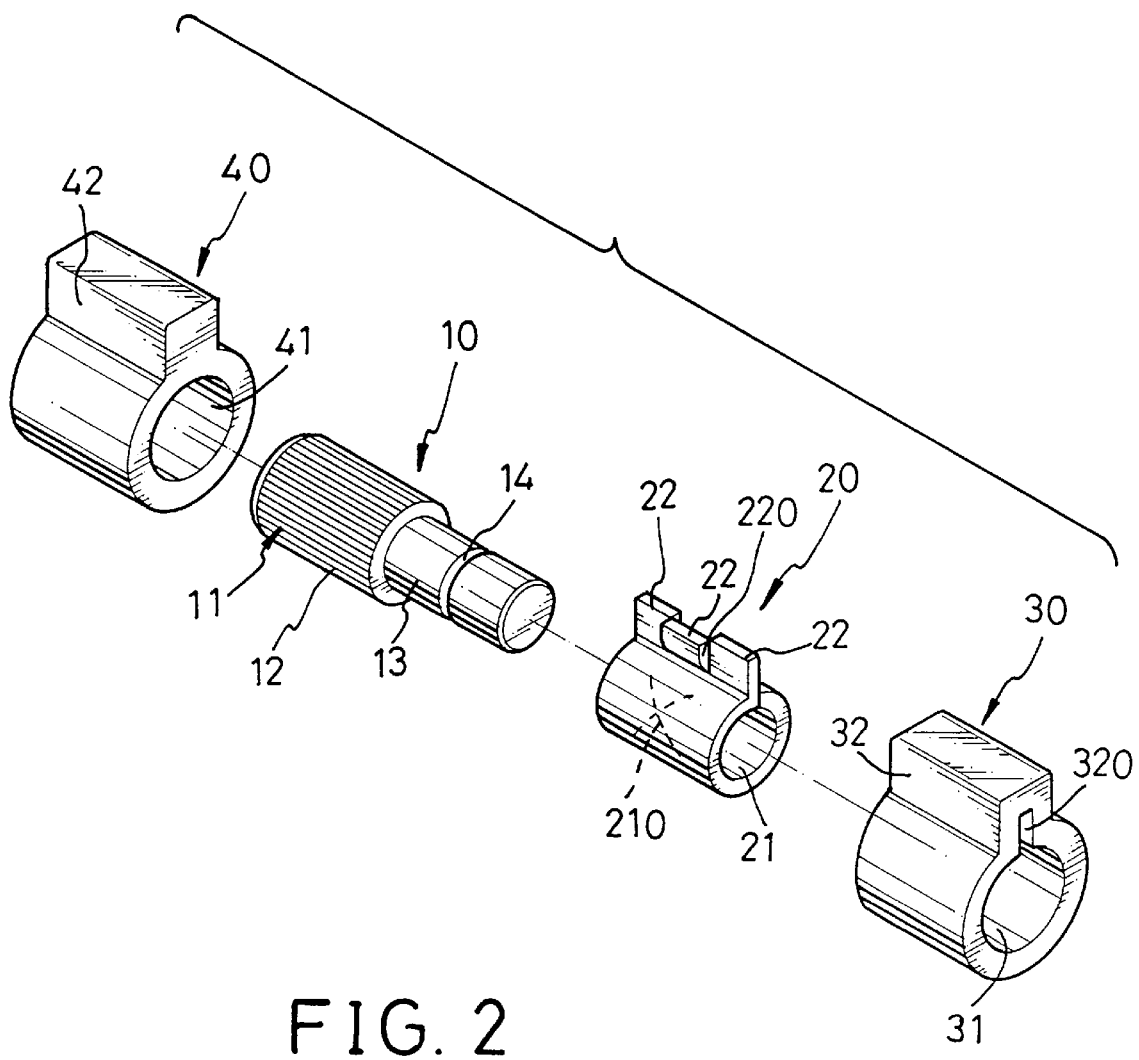
FIG. 2 is an exploded view of the hinge mechanism as shown in FIG. 1.

Referring to the drawings and initially to FIG. 1–3, a hinge mechanism in accordance with the present invention can be adapted to be used for a notebook computer, a mobile telephone and the like and comprises a pivot axle 10 including a first cylindrical portion 11 and a second cylindrical portion 13 having a diameter smaller than that of the first cylindrical portion 11, an inner sleeve 20 rotatably mounted on the second cylindrical portion 13 of the pivot axle 10 and including an inner wall containing a first hole 21 for receiving the second cylindrical portion 13 and an outer wall formed with a plurality of juxtaposed locking pieces 22, a first outer sleeve 30 fixedly mounted on the inner sleeve 20 and including an inner wall containing a second hole 31 for receiving the inner sleeve 20 and an outer wall formed with a retaining block 32 containing a retaining recess 320 connecting to the second hole 31 for receiving the plurality of juxtaposed locking pieces 22, and a second outer sleeve 40 fixedly mounted on the first cylindrical portion 11 of the pivot axle 10.

The second outer sleeve 40 includes an inner wall containing a third hole 41 for receiving the first cylindrical portion 11 of the pivot axle 10. The first cylindrical portion 11 of the pivot axle 10 includes an outer wall longitudinally formed with a plurality of locking keys 12 closely fitted into the third hole 41 of the second outer sleeve 40 such that the first cylindrical portion 11 of the pivot axle 10 is fixedly connected with the second outer sleeve 40. The second outer sleeve 40 further includes an outer wall formed with a fixed lug 42 aligned with the retaining block 32.

The second cylindrical portion 13 of the pivot axle 10 transversely contains an annular groove 14 for receiving lubricating oils therein. In addition, the inner wall of the inner sleeve 20 contains two intersecting slits 210 each connecting to the first hole 21 for receiving lubricating oils therein.

Each of the plurality of locking pieces 22 is made of a flexible material, and a slit 220 is contained between two adjacent locking pieces 22. In addition, the mediate locking piece 22 is preferably arranged in an inclined manner such that when each of the locking pieces 22 is fitted into the retaining recess 320, the mediate locking piece 22 can exert a pressing force on the first outer sleeve 30 by means of its returning action, thereby providing an effect for positioning the locking pieces 22 in the retaining recess 320 such that the first outer sleeve 30 can be secured to the inner sleeve 20 which is pivoted on the pivot axle 10.

By such an arrangement, the first outer sleeve 30 can be pivoted relative to the second outer sleeve 40 about the pivot axle 10.

Figure 4:
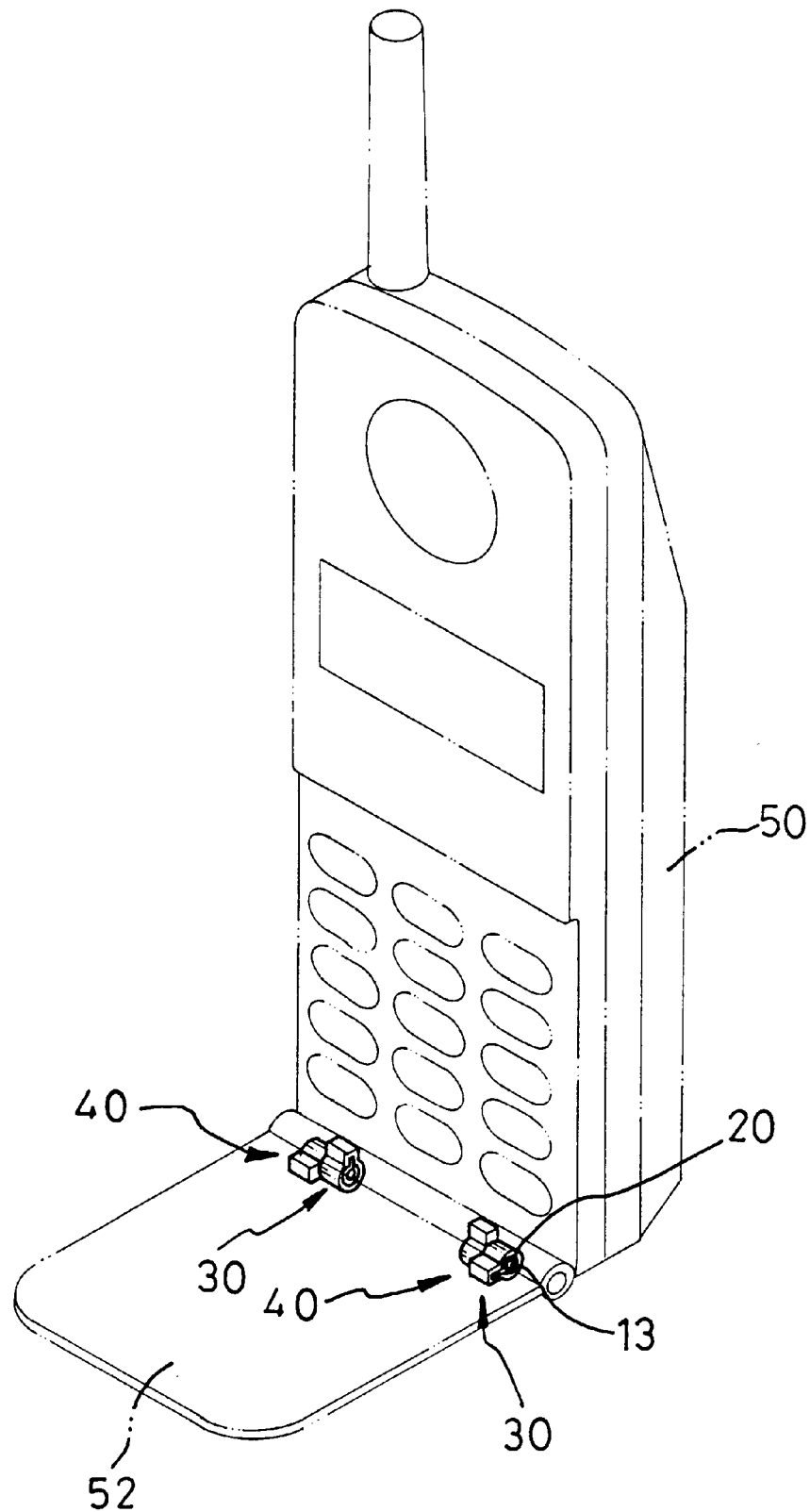
FIG. 4 is an operational view of the hinge mechanism as shown in FIG. 1.

In practice, referring now to FIG. 4 with reference to FIGS. 1–3, two hinge mechanisms in accordance with the present invention each can be used with a mobile telephone set which includes a main body 50 and a transmitter plate 52, wherein the first outer sleeve 30 can be secured to the transmitter plate 52 and the second outer sleeve 40 can be secured to the main body 50, or the first outer sleeve 30 can be secured to the main body 50 and the second outer sleeve 40 can be secured to the transmitter plate 52. In such a manner, the transmitter plate 52 can be pivoted relative to the main body 50 by means of pivoting the first outer sleeve 30 relative to the second outer sleeve 40 about the pivot axle 10.

It should be clear to those skilled in the art that further embodiments may be made without departing from the scope and spirit of the present invention.

What is claimed is:

1. A hinge mechanism comprising:

a pivot axle (10) including a first cylindrical portion (11) and a second cylindrical portion (13) having a diameter smaller than that of said first cylindrical portion (11);

an inner sleeve (20) rotatably mounted on said second cylindrical portion (13) of said pivot axle (10) and including an inner wall containing a first hole (21) for receiving said second cylindrical portion (13) and an outer wall formed with a plurality of juxtaposed locking pieces (22);

a first outer sleeve (30) fixedly mounted on said inner sleeve (20) and including an inner wall containing a second hole (31) for receiving said inner sleeve (20) and an outer wall formed with a retaining block (32) containing a retaining recess (320) connecting to said second hole (31) for receiving said plurality of juxtaposed locking pieces (22); and a second outer sleeve (40) fixedly mounted on said first cylindrical portion (11) of said pivot axle (10).

2. The hinge mechanism in accordance with claim 1, wherein said second outer sleeve (40) includes an inner wall containing a third hole (41) for receiving said first cylindrical portion (11) of said pivot axle (10).

3. The hinge mechanism in accordance with claim 2, wherein said first cylindrical portion (11) of said pivot axle (10) includes an outer wall longitudinally formed with a plurality of locking keys (12) closely fitted into said third hole (41) of said second outer sleeve (40).

4. The hinge mechanism in accordance with claim 1, wherein said second outer sleeve (40) includes an outer wall formed with a fixed lug (42) aligned with said retaining block (32).

5. The hinge mechanism in accordance with claim 1, wherein said second cylindrical portion (13) of said pivot axle (10) transversely contains an annular groove (14).

6. The hinge mechanism in accordance with claim 1, wherein said inner wall of said inner sleeve (20) contains two intersecting slits (210) each connecting to said first hole (21).

7. The hinge mechanism in accordance with claim 1, wherein each of said plurality of locking pieces (22) is made of a flexible material.

8. The hinge mechanism in accordance with claim 1, wherein a slit (220) is contained between two adjacent locking pieces (22).

\* \* \* \* \*